United States Patent
Iga

(10) Patent No.: US 9,862,235 B2
(45) Date of Patent: Jan. 9, 2018

(54) PNEUMATIC TIRE

(75) Inventor: Kohshi Iga, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/404,050

(22) PCT Filed: Jul. 13, 2012

(86) PCT No.: PCT/JP2012/068025
§ 371 (c)(1),
(2), (4) Date: Nov. 26, 2014

(87) PCT Pub. No.: WO2014/010091
PCT Pub. Date: Jan. 16, 2014

(65) Prior Publication Data
US 2015/0298505 A1    Oct. 22, 2015

(51) Int. Cl.
*B60C 1/00* (2006.01)
*B60C 3/00* (2006.01)
(Continued)

(52) U.S. Cl.
CPC .......... *B60C 9/28* (2013.01); *B60C 3/04* (2013.01); *B60C 5/00* (2013.01); *B60C 9/185* (2013.01); *B60C 9/2006* (2013.01); *B60C 11/005* (2013.01); *B60C 2009/1828* (2013.01); *B60C 2009/1871* (2013.01);
(Continued)

(58) Field of Classification Search
CPC B60C 1/0016; B60C 3/00; B60C 3/04; B60C 9/18; B60C 9/1835; B60C 9/22; B60C 11/005
See application file for complete search history.

(56) References Cited

U.S. PATENT DOCUMENTS 4,271,885 A * 6/1981 Takigawa et al. ...... B60C 11/04
                                                152/209.18
4,662,416 A * 5/1987 Yagi .................... B60C 3/04
                                                152/209.14
(Continued)

FOREIGN PATENT DOCUMENTS

CN        1951711      4/2007
CN       101531121     9/2009
(Continued)

OTHER PUBLICATIONS

Machine translation of JP 3-99903, 1991.*
International Search Report for International Application No. PCT/JP2012/068025 dated Sep. 18, 2012, 5 pages, Japan.

*Primary Examiner* — Justin Fischer
(74) *Attorney, Agent, or Firm* — Thorpe North & Western

(57) ABSTRACT

A pneumatic tire comprises a carcass layer, a belt layer disposed on an outer side of the carcass layer in a tire radial direction, and a tread rubber disposed on the outer side of the belt layer in the tire radial direction. The belt layer is formed by laminating a pair of cross belts having a belt angle, as an absolute value, of not less than 10° and not more than 45° and having a belt angles of mutually opposite signs, and a circumferential reinforcing layer having a belt angle within a range of ±5° with respect to a tire circumferential direction. A tread width TW and a total tire width SW have a relationship such that $0.79 \leq TW/SW \leq 0.89$.

19 Claims, 12 Drawing Sheets

(51) Int. Cl.
  *B60C 3/04* (2006.01)
  *B60C 9/22* (2006.01)
  *B60C 9/28* (2006.01)
  *B60C 9/20* (2006.01)
  *B60C 5/00* (2006.01)
  B60C 9/18 (2006.01)
  B60C 11/00 (2006.01)

(52) U.S. Cl.
  CPC ............... *B60C 2009/2064* (2013.01); *B60C 2009/2214* (2013.01); *B60C 2009/2261* (2013.01); *B60C 2009/2266* (2013.01); *B60C 2011/0025* (2013.01); *B60C 2200/06* (2013.01)

(56) References Cited

U.S. PATENT DOCUMENTS

| | | | |
|---|---|---|---|
| 5,718,782 A * | 2/1998 | Fourgon | B60C 1/0016 152/209.1 |
| 8,162,018 B2 * | 4/2012 | Suzuki | B60C 9/2006 152/531 |
| 8,225,835 B2 * | 7/2012 | Harikae | B60C 9/2006 152/527 |
| 2005/0241742 A1 | 11/2005 | Tsuruta et al. | |
| 2005/0269008 A1 * | 12/2005 | Takagi | B60C 9/0007 152/527 |
| 2006/0169380 A1 | 8/2006 | Radulescu et al. | |
| 2006/0169381 A1 | 8/2006 | Radulescu et al. | |
| 2006/0169383 A1 | 8/2006 | Radulescu et al. | |
| 2007/0084533 A1 | 4/2007 | Numata | |
| 2009/0229722 A1 | 9/2009 | Isobe | |
| 2011/0192513 A1 | 8/2011 | Hamada | |
| 2012/0055604 A1 | 3/2012 | Nakayama | |

FOREIGN PATENT DOCUMENTS

| | | | |
|---|---|---|---|
| CN | 102145638 | | 8/2011 |
| CN | 102438844 | | 5/2012 |
| CN | 102145638 | | 3/2015 |
| EP | 427543 | * | 3/1995 |
| EP | 2366560 | | 9/2011 |
| JP | 3-99903 | * | 4/1991 |
| JP | 2002-103913 | | 4/2002 |
| JP | 2004-026099 | | 1/2004 |
| JP | 2004-083001 | | 3/2004 |
| JP | 2004-268820 | | 9/2004 |
| JP | 2004-322718 | | 11/2004 |
| JP | 2005-231529 | | 9/2005 |
| JP | 2008-155867 | | 7/2008 |
| JP | 2009-018629 | | 1/2009 |
| JP | 2009-279953 | | 12/2009 |
| JP | 2010-006319 | | 1/2010 |
| JP | 2010-137813 | | 6/2010 |
| JP | 4642760 | | 3/2011 |
| JP | 4663638 | | 4/2011 |
| JP | 4663639 | | 4/2011 |
| JP | 2012-061890 | | 3/2012 |

* cited by examiner

COMPARATIVE EXAMPLE

WORKING EXAMPLE

| | Conventional Example | Comparative Example | Working Example 1 | Working Example 2 | Working Example 3 | Working Example 4 | Working Example 5 | Working Example 6 |
|---|---|---|---|---|---|---|---|---|
| Presence of circumferential reinforcing layer | Absent | Present | Present | Present | Present | Present | Present | Present |
| TW/SW | 0.92 | 0.92 | 0.89 | 0.79 | 0.87 | 0.90 | 0.92 | 0.92 |
| TW/Wca | 0.96 | 0.96 | 0.93 | 0.93 | 0.93 | 0.92 | 0.82 | 0.91 |
| Gsh/Gcc | 0.85 | 0.85 | 0.85 | 0.85 | 0.85 | 0.85 | 0.85 | 0.85 |
| Ws/TW | - | 0.68 | 0.68 | 0.68 | 0.68 | 0.68 | 0.68 | 0.68 |
| Size relationship of tan $\delta$_cap and tan $\delta$_ut | tan$\delta$_cap =tan$\delta$_ut | tan$\delta$_cap =tan$\delta$_ut | tan$\delta$_cap =tan$\delta$_ut | tan$\delta$_cap =tan$\delta$_ut | tan$\delta$_cap =tan$\delta$_ut | tan$\delta$_cap =tan$\delta$_ut | tan$\delta$_cap =tan$\delta$_ut | tan$\delta$_cap =tan$\delta$_ut |
| tan$\delta$_cap | 0.27 | 0.27 | 0.27 | 0.27 | 0.27 | 0.27 | 0.27 | 0.27 |
| tan$\delta$_ut | 0.27 | 0.27 | 0.27 | 0.27 | 0.27 | 0.27 | 0.27 | 0.27 |
| Yc/Ya | 0.78 | 0.78 | 0.78 | 0.78 | 0.78 | 0.78 | 0.78 | 0.78 |
| Wg/SW | 0.81 | 0.81 | 0.81 | 0.81 | 0.81 | 0.81 | 0.81 | 0.81 |
| Wg/Wca | 0.85 | 0.85 | 0.85 | 0.85 | 0.85 | 0.85 | 0.85 | 0.85 |
| S/Wb | - | 0.02 | 0.02 | 0.02 | 0.02 | 0.02 | 0.02 | 0.02 |
| Belt edge cushion structure | Single structure | Single structure | Single structure | Single structure | Single structure | Single structure | Single structure | Single structure |
| Rolling resistance | 100 | 105 | 110 | 110 | 112 | 110 | 109 | 110 |
| Belt edge separation resistance | 100 | 95 | 100 | 100 | 102 | 100 | 99 | 100 |

FIG. 8a

| | Working Example 7 | Working Example 8 | Working Example 9 | Working Example 10 | Working Example 11 | Working Example 12 | Working Example 13 | Working Example 14 |
|---|---|---|---|---|---|---|---|---|
| Presence of circumferential reinforcing layer | Present | Present | Present | Present | Present | Present | Present | Present |
| TW/SW | 0.87 | 0.87 | 0.87 | 0.92 | 0.92 | 0.87 | 0.87 | 0.87 |
| TW/Wca | 0.91 | 0.93 | 0.93 | 0.91 | 0.91 | 0.91 | 0.91 | 0.91 |
| Gsh/Gcc | 0.85 | 1.10 | 0.9 | 1.10 | 0.9 | 1.10 | 1.10 | 1.10 |
| Ws/TW | 0.68 | 0.68 | 0.68 | 0.68 | 0.68 | 0.68 | 0.80 | 0.90 |
| Size relationship of tan δ_cap and tan δ_ut | tan δ_cap =tan δ_ut | tan δ_cap =tan δ_ut | tan δ_cap =tan δ_ut | tan δ_cap =tan δ_ut | tan δ_cap =tan δ_ut | tan δ_cap =tan δ_ut | tan δ_cap =tan δ_ut | tan δ_cap =tan δ_ut |
| tan δ_cap | 0.27 | 0.27 | 0.27 | 0.27 | 0.27 | 0.27 | 0.27 | 0.27 |
| tan δ_ut | 0.27 | 0.27 | 0.27 | 0.27 | 0.27 | 0.27 | 0.27 | 0.27 |
| Yc/Ya | 0.78 | 0.78 | 0.78 | 0.78 | 0.78 | 0.78 | 0.78 | 0.78 |
| Wg/SW | 0.81 | 0.81 | 0.81 | 0.81 | 0.81 | 0.81 | 0.81 | 0.81 |
| Wg/Wca | 0.85 | 0.85 | 0.85 | 0.85 | 0.85 | 0.85 | 0.85 | 0.85 |
| S/Wb | 0.02 | 0.02 | 0.02 | 0.02 | 0.02 | 0.02 | 0.02 | 0.02 |
| Belt edge cushion structure | Single structure | Single structure | Single structure | Single structure | Single structure | Single structure | Single structure | Single structure |
| Rolling resistance | 114 | 114 | 114 | 112 | 112 | 115 | 116 | 117 |
| Belt edge separation resistance | 104 | 109 | 107 | 107 | 105 | 110 | 111 | 112 |

FIG. 8b

| | Working Example 15 | Working Example 16 | Working Example 17 | Working Example 18 | Working Example 19 | Working Example 20 | Working Example 21 | Working Example 22 |
|---|---|---|---|---|---|---|---|---|
| Presence of circumferential reinforcing layer | Present | Present | Present | Present | Present | Present | Present | Present |
| TW/SW | 0.87 | 0.87 | 0.87 | 0.87 | 0.87 | 0.87 | 0.87 | 0.87 |
| TW/Wca | 0.91 | 0.91 | 0.91 | 0.91 | 0.91 | 0.91 | 0.91 | 0.91 |
| Gsh/Gcc | 1.10 | 1.10 | 1.10 | 1.10 | 1.10 | 1.10 | 1.10 | 1.10 |
| Ws/TW | 0.90 | 0.90 | 0.90 | 0.90 | 0.90 | 0.90 | 0.90 | 0.90 |
| Size relationship of tan δ_cap and tan δ_ut | tanδ_cap >tanδ_ut | tanδ_cap >tanδ_ut | tanδ_cap >tanδ_ut | tanδ_cap >tanδ_ut | tanδ_cap >tanδ_ut | tanδ_cap >tanδ_ut | tanδ_cap >tanδ_ut | tanδ_cap >tanδ_ut |
| tanδ_cap | 0.27 | 0.25 | 0.25 | 0.18 | 0.18 | 0.18 | 0.18 | 0.18 |
| tanδ_ut | 0.15 | 0.13 | 0.10 | 0.13 | 0.10 | 0.10 | 0.10 | 0.10 |
| Yc/Ya | 0.78 | 0.78 | 0.78 | 0.78 | 0.78 | 0.80 | 0.85 | 0.90 |
| Wg/SW | 0.81 | 0.81 | 0.81 | 0.81 | 0.81 | 0.81 | 0.81 | 0.81 |
| Wg/Wca | 0.85 | 0.85 | 0.85 | 0.85 | 0.85 | 0.85 | 0.85 | 0.85 |
| S/Wb | 0.02 | 0.02 | 0.02 | 0.02 | 0.02 | 0.02 | 0.02 | 0.02 |
| Belt edge cushion structure | Single structure | Single structure | Single structure | Single structure | Single structure | Single structure | Single structure | Single structure |
| Rolling resistance | 118 | 120 | 121 | 123 | 124 | 125 | 127 | 126 |
| Belt edge separation resistance | 113 | 115 | 116 | 118 | 119 | 120 | 125 | 121 |

FIG. 9a

| | Working Example 23 | Working Example 24 | Working Example 25 | Working Example 26 | Working Example 27 | Working Example 28 | Working Example 29 | Working Example 30 |
|---|---|---|---|---|---|---|---|---|
| Presence of circumferential reinforcing layer | Present | Present | Present | Present | Present | Present | Present | Present |
| TW/SW | 0.87 | 0.87 | 0.87 | 0.87 | 0.87 | 0.87 | 0.87 | 0.87 |
| TW/Wca | 0.91 | 0.91 | 0.91 | 0.91 | 0.91 | 0.91 | 0.91 | 0.91 |
| Gsh/Gcc | 1.10 | 1.10 | 1.10 | 1.10 | 1.00 | 1.00 | 1.00 | 1.00 |
| Ws/TW | 0.90 | 0.90 | 0.90 | 0.90 | 0.90 | 0.90 | 0.90 | 0.90 |
| Size relationship of tan δ_cap and tan δ_ut | tanδ_cap >tanδ_ut | tanδ_cap >tanδ_ut | tanδ_cap >tanδ_ut | tanδ_cap >tanδ_ut | tanδ_cap >tanδ_ut | tanδ_cap >tanδ_ut | tanδ_cap >tanδ_ut | tanδ_cap >tanδ_ut |
| tanδ_cap | 0.18 | 0.18 | 0.18 | 0.18 | 0.18 | 0.18 | 0.18 | 0.18 |
| tanδ_ut | 0.10 | 0.10 | 0.10 | 0.10 | 0.10 | 0.10 | 0.10 | 0.10 |
| Yc/Ya | 0.85 | 0.85 | 0.85 | 0.85 | 0.85 | 0.85 | 0.85 | 0.85 |
| Wg/SW | 0.80 | 0.78 | 0.78 | 0.76 | 0.76 | 0.76 | 0.76 | 0.76 |
| Wg/Wca | 0.86 | 0.85 | 0.84 | 0.82 | 0.82 | 0.82 | 0.82 | 0.82 |
| S/Wb | 0.02 | 0.02 | 0.02 | 0.02 | 0.02 | 0.03 | 0.05 | 0.1 |
| Belt edge cushion structure | Single structure | Single structure | Single structure | Single structure | Single structure | Single structure | Single structure | Two-color structure |
| Rolling resistance | 128 | 129 | 130 | 131 | 132 | 132 | 132 | 132 |
| Belt edge separation resistance | 123 | 124 | 125 | 126 | 125 | 126 | 128 | 132 |

FIG. 9b

PNEUMATIC TIRE

TECHNICAL FIELD

The present invention relates to a pneumatic tire, and more particularly relates to a pneumatic tire that can reduce the tire rolling resistance.

BACKGROUND

Conventional pneumatic tires have a circumferential reinforcing layer in a belt layer. The circumferential reinforcing layer is a belt ply having a belt angle that is substantially 0° with respect to the tire circumferential direction, and is disposed so as to be stacked upon a pair of cross belts. The technology disclosed in Japanese Patent No. 4642760, Japanese Patent No. 4663638, and Japanese Patent No. 4663639 includes conventional pneumatic tires that are configured in this manner.

SUMMARY

The present technology provides a pneumatic tire that can reduce the tire rolling resistance. A pneumatic tire according to the present invention comprises a carcass layer, a belt layer disposed on an outer side of the carcass layer in a tire radial direction, and a tread rubber disposed on the outer side of the belt layer in the tire radial direction. In such a pneumatic tire, the belt layer is formed by laminating a pair of cross belts having a belt angle, as an absolute value, of not less than 10° and not more than 45° and having belt angles of mutually opposite signs, and a circumferential reinforcing layer having a belt angle within a range of ±5° with respect to a tire circumferential direction; and a tread width TW and a total tire width SW have a relationship such that $0.79 \leq TW/SW \leq 0.89$.

Additionally, the pneumatic tire according to the present invention comprises a carcass layer, a belt layer disposed on an outer side of the carcass layer in a tire radial direction, and a tread rubber disposed on the outer side of the belt layer in the tire radial direction. In such a pneumatic tire, the belt layer is formed by laminating a pair of cross belts having a belt angle, as an absolute value, of not less than 10° and not more than 45° and having belt angles of mutually opposite signs, and a circumferential reinforcing layer having a belt angle within a range of ±5° with respect to a tire circumferential direction; and a tread width TW and a cross-sectional width Wca of the carcass layer have a relationship such that $0.82 \leq TW/Wca \leq 0.92$.

In this pneumatic tire, radial growth in a center region is suppressed due to the belt layer having the circumferential reinforcing layer. Furthermore, a difference in radial growths between the center region and a shoulder region is alleviated due to the ratio TW/SW being within the above range. As a result, there is an advantage that ground contact pressure distribution of the tire is made uniform and the rolling resistance of the tire is reduced.

Moreover, in the pneumatic tire, radial growth in the center region is suppressed due to the belt layer having the circumferential reinforcing layer. Furthermore, a difference in radial growths between the center region and a shoulder region is alleviated and the ground contact pressure distribution in a tire width direction is made uniform due to the ratio TW/Wca being within the above range. As a result, there is an advantage that the ground contact pressure distribution of the tire is made uniform and the rolling resistance of the tire is reduced.

BRIEF DESCRIPTION OF THE DRAWINGS

FIGS. 8a-8b include a table showing results of performance testing of pneumatic tires according to embodiments of the present invention.

FIGS. 9a-9b include a table showing results of performance testing of pneumatic tires according to embodiments of the present invention.

DETAILED DESCRIPTION

The present invention is described below in detail with reference to the drawings. However, the present invention is not limited to these embodiments. Moreover, constituents of the embodiment which can possibly or obviously be substituted while maintaining consistency with the present invention are included. Furthermore, the multiple modified examples described in the embodiment can be combined as desired within the scope apparent to a person skilled in the art.

Pneumatic Tire

Figure 1:
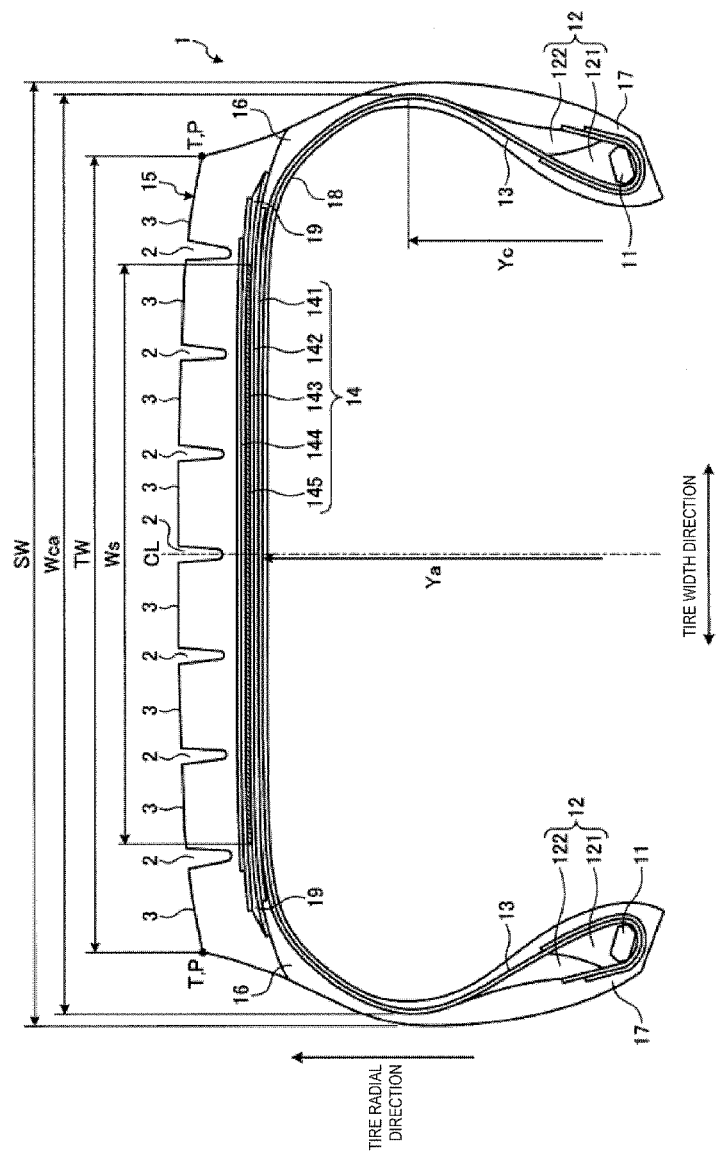
FIG. 1 is a cross-sectional view in a tire meridian direction illustrating a pneumatic tire according to an embodiment of the present invention.

FIG. 1 is a cross-sectional view in a tire meridian direction illustrating a pneumatic tire according to an embodiment of the present invention. In this drawing, a radial tire for heavy loads that is mounted on trucks, buses, and the like for long-distance transport is illustrated as an example of the pneumatic tire 1. Note that the symbol CL refers to a tire equator plane. Moreover, a tread edge P and a tire ground contact edge T are in accord with each other in FIG. 1. The circumferential reinforcing layer 145 in FIG. 1 is indicated by hatching.

The pneumatic tire 1 includes a pair of bead cores 11,11, a pair of bead fillers 12,12, a carcass layer 13, a belt layer 14, tread rubber 15, a pair of side wall rubbers 16,16, and a pair of rim cushion rubbers 17, 17 (see FIG. 1).

The pair of bead cores 11,11 have annular structures and constitute cores of left and right bead portions. The pair of bead fillers 12,12 are formed from a lower filler 121 and an upper filler 122, and are disposed on a periphery of each of the pair of bead cores 11,11 in a tire radial direction so as to reinforce the bead portions.

The carcass layer 13 stretches between the left and right side bead cores 11 and 11 in toroidal form, forming a framework for the tire. Additionally, both ends of the carcass layer 13 are folded from an inner side in a tire width direction toward an outer side in the tire width direction and fixed so as to wrap around the bead cores 11 and the bead fillers 12. Also, the carcass layer 13 is constituted by a plurality of carcass cords formed from steel or organic fibers (for example, nylon, polyester, rayon, or the like), covered by coating rubber, and subjected to a rolling process, having a carcass angle (the angle of inclination of the fiber direction of the carcass cords with respect to the tire circumferential direction), as an absolute value, of not less than 85° and not greater than 95°.

The belt layer 14 is formed by laminating a plurality of belt plies 141 to 145, and disposed to extend over a periphery of the carcass layer 13. A detailed configuration of the belt layer 14 is described below.

The tread rubber 15 is disposed on the periphery of the carcass layer 13 and the belt layer 14 in the tire radial direction, and forms a tire tread. The pair of side wall rubbers 16,16 is disposed on each outer side of the carcass layer 13 in the tire width direction, so as to form left and right side wall portions of the tire. The pair of rim cushion rubbers 17, 17 are respectively disposed on the outer side in the tire width direction of the left and right bead cores 11, 11 and bead fillers 12, 12, so as to form left and right bead portions.

In the configuration illustrated in FIG. 1, the pneumatic tire 1 includes seven circumferential main grooves 2 that extend in a tire circumferential direction, and eight land portions 3 partitioned and formed by the circumferential main grooves 2. The land portions 3 are formed of blocks that are segmented in the circumferential direction by ribs or lug grooves (not illustrated on the drawings) that continue in the tire circumferential direction.

Belt Layer

Figure 2:
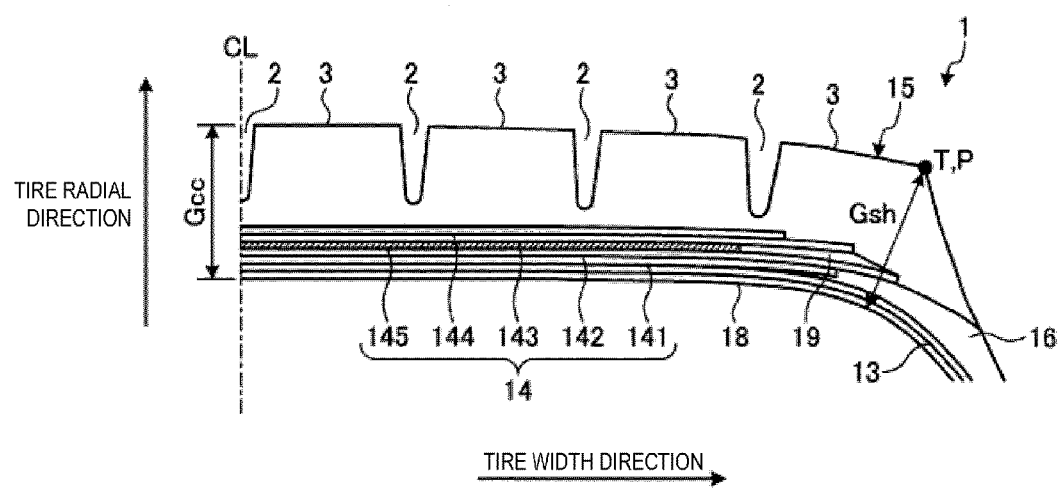
FIG. 2 is an explanatory view illustrating a belt layer of the pneumatic tire depicted in FIG. 1.
Figure 3:
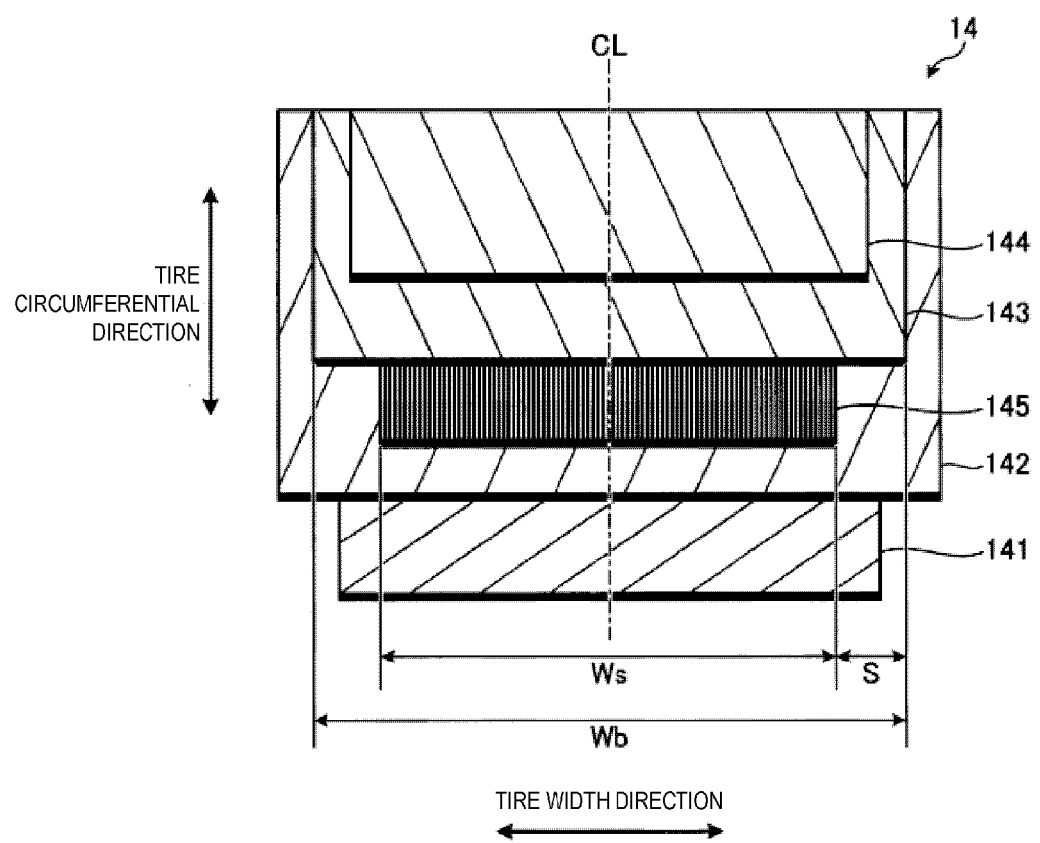
FIG. 3 is an explanatory view illustrating the belt layer of the pneumatic tire depicted in FIG. 1.

FIGS. 2 and 3 are explanatory views illustrating a belt layer of the pneumatic tire depicted in FIG. 1. Among these drawings, FIG. 2 illustrates a region on one side of the tread portion demarcated by the tire equatorial plane CL, and FIG. 3 illustrates a laminated structure of the belt layer. The circumferential reinforcing layer 145 in FIG. 2 is indicated by hatching. The thin lines in the belt plies 141 to 145 in FIG. 3 schematically represent the inclination of belt cords.

The belt layer 14 is formed by laminating a large angle belt 141, a pair of cross belts 142, 143, a belt cover 144, and a circumferential reinforcing layer 145, disposed on the periphery of the carcass layer 13 (see FIG. 2).

The large angle belt 141 is configured by a plurality of belt cords formed from steel or organic fibers, covered by coating rubber, and subjected to a rolling process, having a belt angle (angle of inclination of the fiber direction of the belt cords with respect to the tire circumferential direction), as an absolute value, of not less than 45° and not more than 70°. Also, the large angle belt 141 is disposed so as to be laminated outward in the tire radial direction of the carcass layer 13.

The pair of cross belts 142, 143 are configured by a plurality of belt cords formed from steel or organic fibers, covered by coating rubber, and subjected to a rolling process, having a belt angle, as an absolute value, of not less than 10° and not more than 45°. Additionally, the pair of cross belts 142, 143 have belt angles that are of mutually opposite sign to each other, and are laminated so that the fiber directions of the belt cords intersect each other (a crossply structure). In the following description, the cross belt 142 positioned on the inner side in the tire radial direction is referred to as "inner-side cross belt", and the cross belt 143 positioned on the outer side in the tire radial direction is referred to as "outer-side cross belt". Three or more cross belts may be disposed so as to be laminated (not illustrated on the drawings). Also, the pair of cross belts 142, 143 are disposed so as to be laminated outward in the tire radial direction of the large angle belt 141.

Also, the belt cover 144 is configured by a plurality of belt cords formed from steel or organic fibers, covered by coating rubber, and subjected to a rolling process, having a belt angle, as an absolute value, of not less than 10° and not more than 45°. Also, the belt cover 144 is disposed so as to be laminated outward in the tire radial direction of the cross belts 142, 143. In this embodiment, the belt cover 144 has the same belt angle as the outer-side cross belt 143, and, is disposed in the outermost layer of the belt layer 14.

The circumferential reinforcing layer 145 is configured by belt cords formed from steel, and covered by coating rubber that are wound in a spiral manner with an inclination within a range of ±5° with respect to the tire circumferential direction. Also, the circumferential reinforcing layer 145 is disposed so as to be interposed between the pair of cross belts 142, 143. Also, the circumferential reinforcing layer 145 is disposed inward in the tire width direction of left and right edges of the pair of cross belts 142, 143. Specifically, one or a plurality of wires is wound spirally around the periphery of the inner-side cross belt 142, to form the circumferential reinforcing layer 145. This circumferential reinforcing layer 145 reinforces the stiffness in the tire circumferential direction. As a result, the durability of the tire is improved.

In the pneumatic tire 1, the belt layer 14 may have an edge cover (not illustrated on the drawings). Generally, the edge cover is constituted by a plurality of belt cords formed from steel or organic fibers, covered by coating rubber, and subjected to a rolling process, having a belt angle, as an absolute value, of not less than 0° and not greater than 5°. Also, the edge cover is disposed outward in the tire radial direction of the left and right edges of the outer-side cross belt 143 (or the inner-side cross belt 142). As a result of the band effect of the edge cover, the difference in radial growth of a tread center region and a shoulder region is alleviated, and the uneven wear resistance performance of the tire is improved.

Rolling Resistance Reduction Configuration

Recent heavy duty tires singly mounted on trucks and buses and the like demonstrate increased stiffness in the tire circumferential direction and reduced rolling resistance due to the tires having a low aspect ratio and due to the disposition of the circumferential reinforcing layer in the belt layer.

However, there has been a demand recently in the large truck and bus industry to further reduce rolling resistance in order to address environmental concerns by improving fuel efficiency.

Accordingly, the pneumatic tire 1 uses the following configuration to reduce rolling resistance (see FIGS. 1 to 3).

As illustrated in FIG. 1, in the pneumatic tire 1, a tread width TW and a total tire width SW have a relationship such that $0.79 \leq TW/SW \leq 0.89$.

The tread width TW refers to a linear distance between the left and right tread edges P when the tire is assembled on a standard rim and filled to a prescribed internal pressure and is in an unloaded state.

Figure 10:
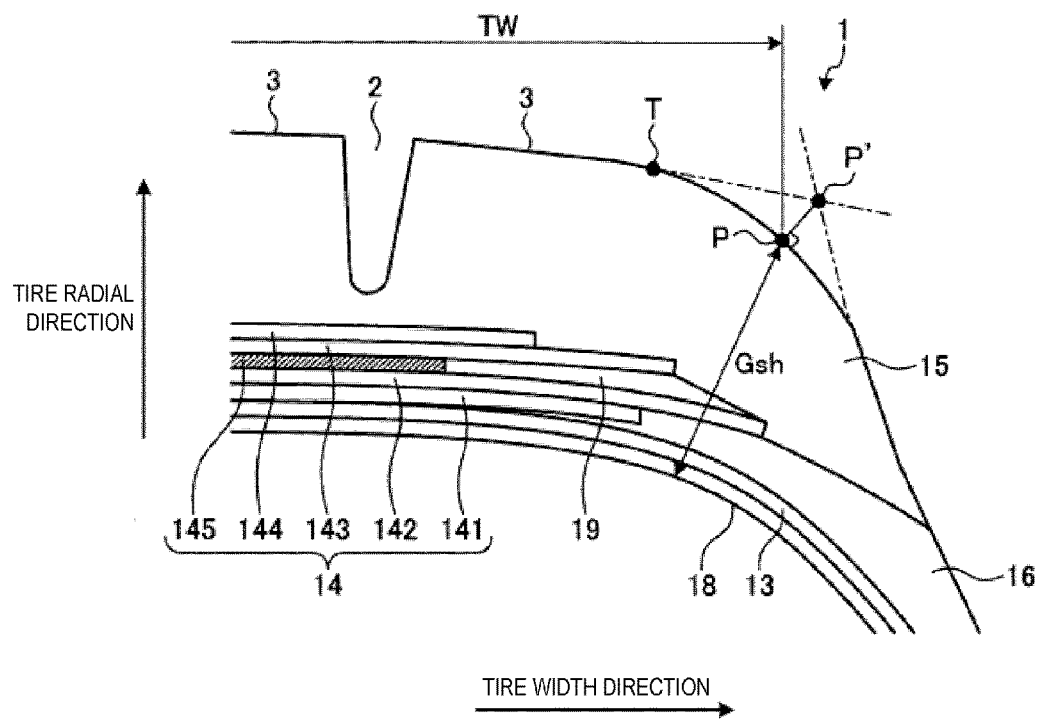
FIG. 10 is an explanatory view illustrating a shoulder portion having a round shape.

The tread edge P refers to a point of the tread edge portion in a configuration having a (1) square shaped shoulder portion. For example, in the configuration illustrated in FIG. 2, the tread edge P and a tire ground contact edge T are in accord with each other due to the shoulder portion having a square shape. Conversely, in a configuration (2) as illustrated in FIG. 10 where the shoulder portion has a round shape, an intersection P' is taken from the tread portion profile and the side wall portion profile when viewed as a cross-section from the tire meridian direction, and the tread edge P is taken as the bottom of a perpendicular line drawn from the intersection P' to the shoulder portion.

Note that the "tire ground contact edge T" refers to the maximum width position in a tire axial direction of a contact surface between the tire and a flat plate in a configuration in which the tire is assembled on a regular rim, filled to a prescribed internal pressure, placed perpendicularly to the flat plate in a static state, and loaded with a load corresponding to a prescribed load.

The total tire width SW refers to a linear distance (including all portions such as letters and patterns on the tire surface) between the side walls when the tire is assembled on a regular rim and filled to a prescribed internal pressure and is in an unloaded state.

Herein, "standard rim" refers to a "standard rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the regular internal pressure is an air pressure of 180 kPa, and the regular load is 88% of the maximum load capacity.

Additionally, in the pneumatic tire 1, the tread width TW and a cross-sectional width Wca of the carcass layer 13 have a relationship such that $0.82 \leq TW/Wca \leq 0.92$ (see FIG. 1).

The cross-sectional width Wca of the carcass layer 13 refers to a linear distance between the left and right maximum width positions of the carcass layer 13 when the tire is assembled on a standard rim and filled to a prescribed internal pressure and is in an unloaded state.

Figure 4A:
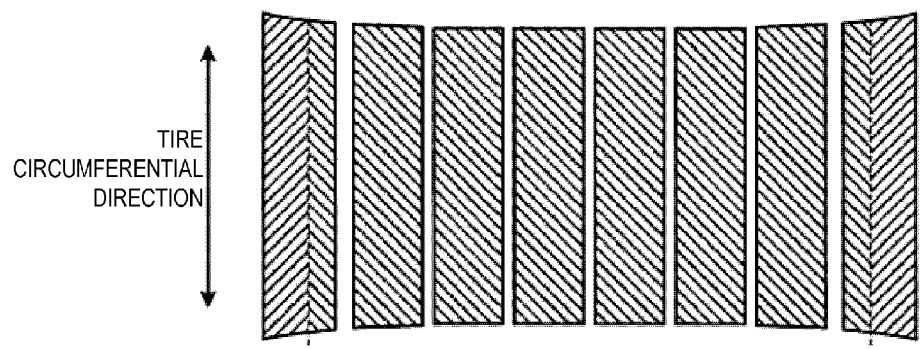
FIG. 4 is an explanatory view illustrating the effect of the pneumatic tire depicted in FIG. 1.
Figure 4B:
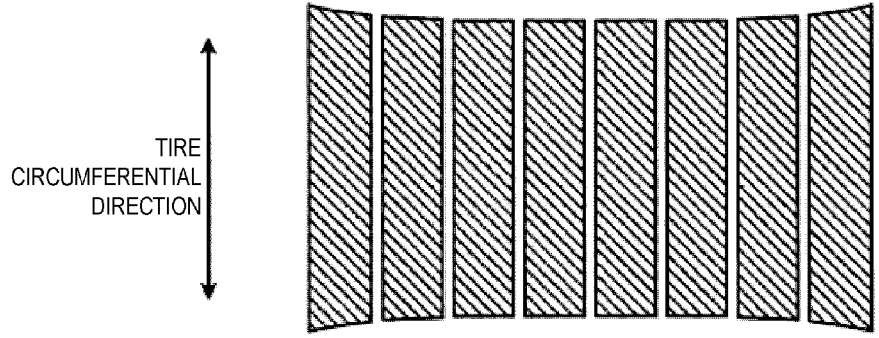

FIG. 4 is an explanatory view illustrating the effect of the pneumatic tire depicted in FIG. 1. A Comparative Example in FIG. 4A and a Working Example in FIG. 4B both show ground contact shapes of the pneumatic tire having the circumferential reinforcing layer. However, in the Comparative Example in FIG. 4A, the ratio TW/SW and the ratio TW/Wca are outside of the above-mentioned ranges, while on the other hand, in the Working Example in FIG. 4B, the ratio TW/SW and the ratio TW/Wca are within the above-mentioned ranges.

In the configuration illustrated in FIG. 4A, radial growth in a center region is suppressed due to the belt layer having the circumferential reinforcing layer. However, the radial growth in the left and right shoulder portions is large since the above ratios TW/SW, TW/Wca are improper and thus the ground contact pressure distribution in the tire width direction is not uniform. As a result, the rolling resistance of the tire increases and fuel consumption of the tire becomes worse.

Conversely, with the configuration illustrated in FIG. 4B, the circumferential reinforcing layer 145 suppresses the radial growth in the center region, and the radial growth in the shoulder portion is suppressed since the ratios TW/SW, TW/Wca fall within the above-mentioned ranges. As a result, the difference in radial growth in a center region and a shoulder region is alleviated. Specifically, when comparing FIGS. 4A and 4B, it can be seen that deformation when the tire makes ground contact is reduced with the configuration illustrated in FIG. 4(b). As a result, the ground contact pressure distribution of the tire is made uniform and the rolling resistance of the tire is reduced so that tire fuel consumption is improved.

Detailed Configuration of Belt Layer and Profile

As illustrated in FIG. 2, with the pneumatic tire 1, a distance Gcc from the tread profile to the tire inner circumferential surface along the tire equatorial plane CL, and a distance Gsh from the tread edge P to the tire inner circumferential surface preferably have a relationship such that $0.85 \leq Gsh/Gcc \leq 1.10$, and more preferably have a relationship such that $0.90 \leq Gsh/Gcc \leq 1.00$. As a result, the relationship between the gauge (distance Gcc) at the tire equatorial plane CL and the gauge (distance Gsh) at the tread edge P is made appropriate.

The distance Gcc is measured as the distance from the intersection of the tire equatorial plane CL and the tread profile to the intersection of the tire equatorial plane CL and the tire inner circumferential surface when viewed as a cross-section from the tire meridian direction. Therefore, in a configuration having a circumferential main groove 2 at the tire equatorial plane CL such as the configuration illustrated in FIG. 1 and FIG. 2, the distance Gcc is measured omitting the circumferential main groove 2. The distance Gsh is measured as the length of a perpendicular line from the tread edge P to the tire inner circumferential surface when viewed as a cross-section from the tire meridian direction.

In the configuration illustrated in FIG. 2, the pneumatic tire 1 includes an inner liner 18 on the inner circumferential surface of the carcass layer 13, and the inner liner 18 is disposed across the entire region of the tire inner circumferential surface. In such a configuration, the distance Gcc and the distance Gcc are measured on the basis of the outer surface of the inner liner 18 (tire inner circumferential surface).

In the pneumatic tire 1, as illustrated in FIG. 1, the width Ws of the circumferential reinforcing layer 145 is preferably within a range such that $0.70 \leq Ws/TW \leq 0.90$ with respect to the tread width TW. As a result, the ratio Ws/TW of the width Ws of the circumferential reinforcing layer 145 and the tread width TW is made appropriate.

The width Ws of the circumferential reinforcing layer 145 is measured when the tire is assembled on a standard rim, inflated to a prescribed internal pressure and is in an unloaded state. The width Ws of the circumferential reinforcing layer 145 is the sum of the widths of the divided portions when the circumferential reinforcing layer 145 has a structure in which the circumferential reinforcing layer 145 is divided in the tire width direction (not illustrated on the drawings).

Moreover, in the pneumatic tire 1, as illustrated in FIG. 1, a diameter Ya of the highest position and a diameter Yc of the widest position of the carcass layer 13 preferably have a relationship such that $0.80 \leq Yc/Ya \leq 0.90$. As a result, the diameter ratio Yc/Ya of the carcass layer 13 is made appropriate.

The diameter Ya of the highest position of the carcass layer 13 is measured as the distance from the tire rotational axis to the intersection of the tire equatorial plane CL and the carcass layer 13 when the tire is assembled on a standard rim and inflated to a prescribed internal pressure and is in an unloaded state. The diameter Yc of the widest position of the carcass layer 13 is measured as the distance from the tire rotational axis to the widest position of the carcass layer 13 when the tire is assembled on a standard rim and inflated to a prescribed internal pressure and is in an unloaded state.

Also, in the pneumatic tire 1, the belt cords that constitute the circumferential reinforcing layer 145 are steel wire, and the circumferential reinforcing layer 145 preferably has not less than 17 ends/50 mm and not more than 30 ends/50 mm.

In the pneumatic tire 1, the elongation of the belt cords from which the circumferential reinforcing layer 145 is configured when they are components when subjected to a tensile load of 100 N to 300 N is preferably not less than 1.0% and not more than 2.5%. Also, the elongation of the belt cords of the circumferential reinforcing layer 145 when in the tire (the state when taken from the tire product) when subjected to a tensile load of 500 N to 1000 N is preferably not less than 0.5% and not more than 2.0%. The belt cords (high elongation steel wire) have good elongation ratio when a low load is applied compared with normal steel wire, so they can withstand the loads that are applied to the circumferential reinforcing layer 145 during the time from manufacture until the tire is used, so it is possible to suppress damage to the circumferential reinforcing layer 145, which is desirable.

The elongation of the belt cord is measured in accordance with JIS G3510.

Also, as illustrated in FIG. 3, in the pneumatic tire 1, the circumferential reinforcing layer 145 is preferably disposed inward in the tire width direction from the left and right edges of the narrower cross belt 143 of the pair of cross belts 142, 143. Also, preferably the width Wb of the narrower cross belt 143 and the distance S from the edge of the circumferential reinforcing layer 145 to the edge of the narrower cross belt 143 are in the ranges such that 0.03≤S/Wb. As a result, the distance between the end portions of the width Wb of the cross belt 143 and the end portions of the circumferential reinforcing layer 145 are appropriately secured. This point is the same even if the circumferential reinforcing layer 145 has a divided structure (not illustrated on the drawings).

The width Wb of the narrower cross belt 143 and the distance S of the circumferential reinforcing layer 145 are measured as distances in the tire width direction when viewed as a cross-section from the tire meridian direction.

Also, in the configuration illustrated in FIG. 1, the circumferential reinforcing layer 145 is constituted from a single steel wire that is wound spirally. However, the configuration is not limited thereto, and the circumferential reinforcing layer 145 may be constituted from a plurality of wires wound spirally around side-by-side to each other (multiple winding structure). In this case, preferably, the number of wires is not greater than 5. Also, preferably, the width of winding per unit when 5 wires are wound in multiple layers is not greater than 12 mm. In this way, a plurality (not less than 2 and not greater than 5) of wires can be wound properly at a slant within a range of ±5° with respect to the tire circumferential direction.

Also, in the configuration illustrated in FIG. 2, the circumferential reinforcing layer 145 is disposed so as to be interposed between the pair of cross belts 142, 143 (see FIG. 2). However, the configuration is not limited thereto, and the circumferential reinforcing layer 145 may be disposed on an inner side of the pair of cross belts 142, 143. For example, the circumferential reinforcing layer 145 may be (1) disposed between the large angle belt 141 and the inner-side cross belt 142, or (2) disposed between the carcass layer 13 and the large angle belt 141 (not illustrated on the drawings).

Tire Ground Contact Shape

Figure 5:
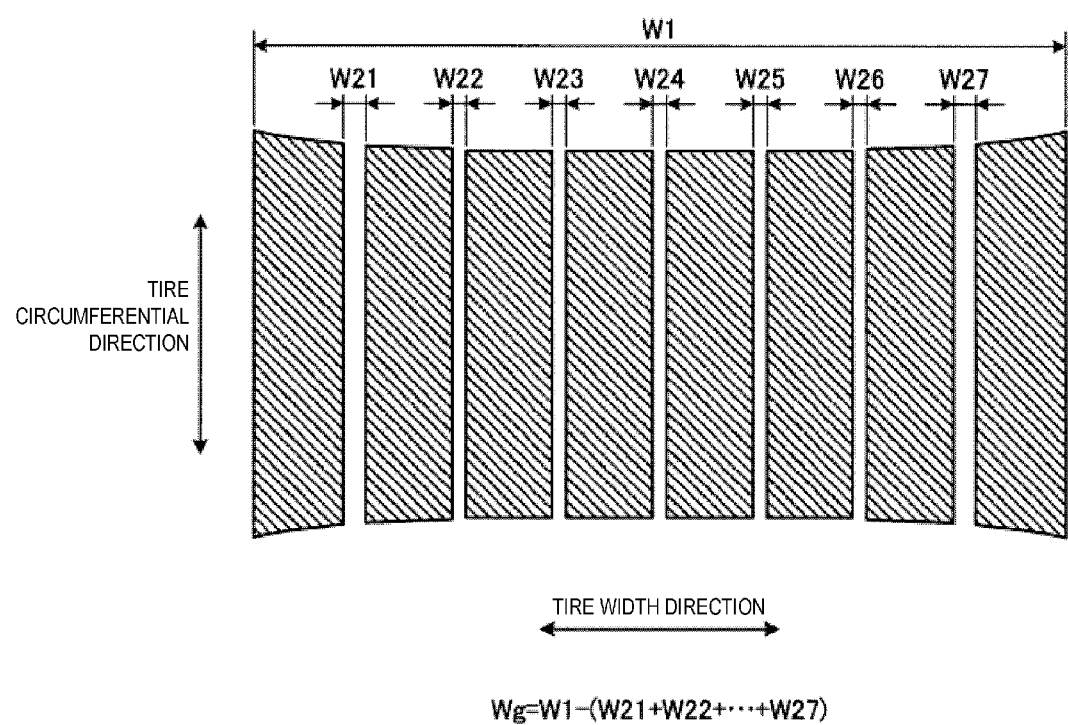
FIG. 5 is an explanatory view illustrating a ground contact shape of the pneumatic tire depicted in FIG. 1.

FIG. 5 is an explanatory view illustrating the ground contact shape of the pneumatic tire depicted in FIG. 1. This drawing illustrates the form of the tire ground contact patch when the tire makes ground contact.

In the pneumatic tire 1, as illustrated in FIG. 5, a tire actual ground contact width Wg and the total tire width SW (see FIG. 1) preferably have a relationship such that 0.60≤Wg/SW≤0.80. As a result, the ratio Wg/SW of the tire actual ground contact width Wg and the total tire width SW is made appropriate.

As illustrated in FIG. 5, the tire actual ground contact width Wg is defined as the difference (Wg=W1−W21+W22+ . . . +W27) between a tire ground contact width W1 and the sum W21+W22+ . . . +W27 of the groove widths of the circumferential main grooves 2. In this way, the circumferential main grooves 2 are omitted since they do not contribute to tire rolling resistance.

The tire ground contact width W1 and the groove widths W21, W22, . . . , W27 of the circumferential main grooves 2 are measured as the maximum linear distance in the tire axial direction of a contact surface between the tire and a flat plate in a configuration in which the tire is assembled on a standard rim, filled to a prescribed internal pressure, placed perpendicularly with respect to the flat plate in a static state, and loaded with a load corresponding to a prescribed load.

In the pneumatic tire 1, the tire actual ground contact width Wg (see FIG. 5) and the cross-sectional width Wca of the carcass layer 13 (see FIG. 1) preferably have a relationship such that 0.64≤Wg/Wca≤0.84. As a result, the ratio Wg/Wca of the tire actual ground contact width Wg and the cross-sectional width Wca of the carcass layer 13 is made appropriate.

Tread Rubber Double Layer Structure

Figure 6:
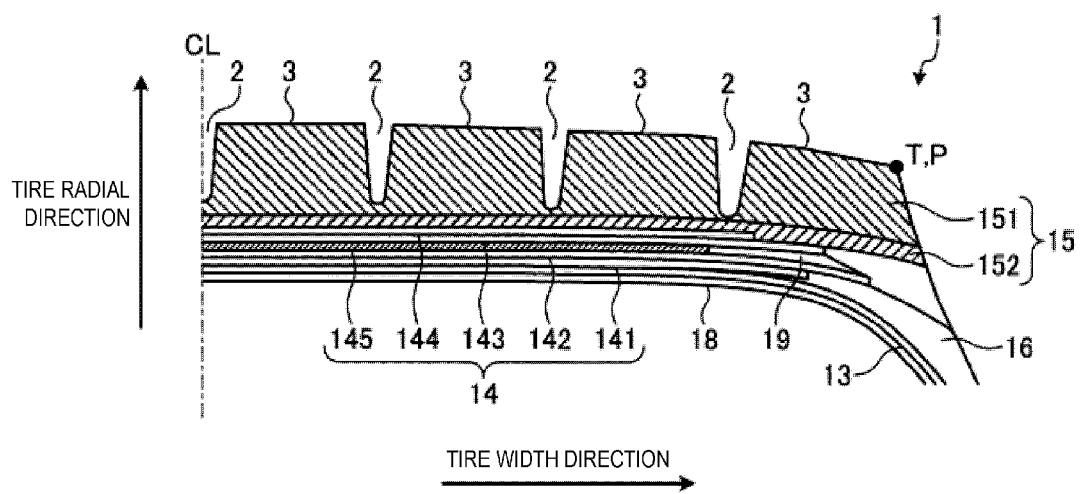
FIG. 6 is an explanatory view illustrating a modified example of the pneumatic tire depicted in FIG. 1.

FIG. 6 is an explanatory view of a modified example of the pneumatic tire depicted in FIG. 1. FIG. 6 illustrates a region on one side of a tread portion demarcated by the tire equatorial plane CL. Also, in FIG. 6, the circumferential reinforcing layer 145 and the tread rubber 15 are indicated by hatching.

In the configuration illustrated in FIG. 1, the tread rubber 15 has a single structure formed from a single rubber material, and is disposed on the outer side of the belt layer 14 in the tire radial direction so as to be disposed across the entire tread portion.

However, without being limited as such, the tread rubber 15 may have a double layer structure formed by laminating a cap rubber 151 and an under rubber 152 as illustrated in FIG. 6. The cap rubber 151 is rubber that constitutes the tread surface when the tire is new and is disposed across the entire tread outer surface. The under rubber 152 is rubber disposed between the cap rubber 151 and the belt layer 14.

In this case, a loss tangent tan δ_cap of the cap rubber 151 and a loss tangent tan δ_ut of the under rubber 152 preferably have a relationship such that tan δ_cap>tan δ_ut. Therefore, the under rubber 152 having a low loss tangent tan δ_ut is disposed on the belt layer 14 side (layer under the cap rubber 151) that easily emits heat when the tire is rolling. As a result, the tread stiffness is secured.

The loss tangent tan δ_cap and tan δ_ut are measured by using a viscoelastic spectrometer under the conditions of a temperature of 60° C., a shearing strain of 10%, and a frequency of 20 Hz.

In the above configuration, the loss tangent tan δ_cap of the cap rubber 151 is preferably within a range of tan δ_cap≤0.25, and the loss tangent tan δ_ut of the under rubber 152 is preferably within a range of tan δ_ut≤0.13. The loss tangents tan δ_cap and tan δ_ut are preferably as low as possible but the lower limit thereof is restricted by the material properties of the cap rubber 151 and the under rubber 152.

Belt Edge Cushion Two-Color Structure

Figure 7:
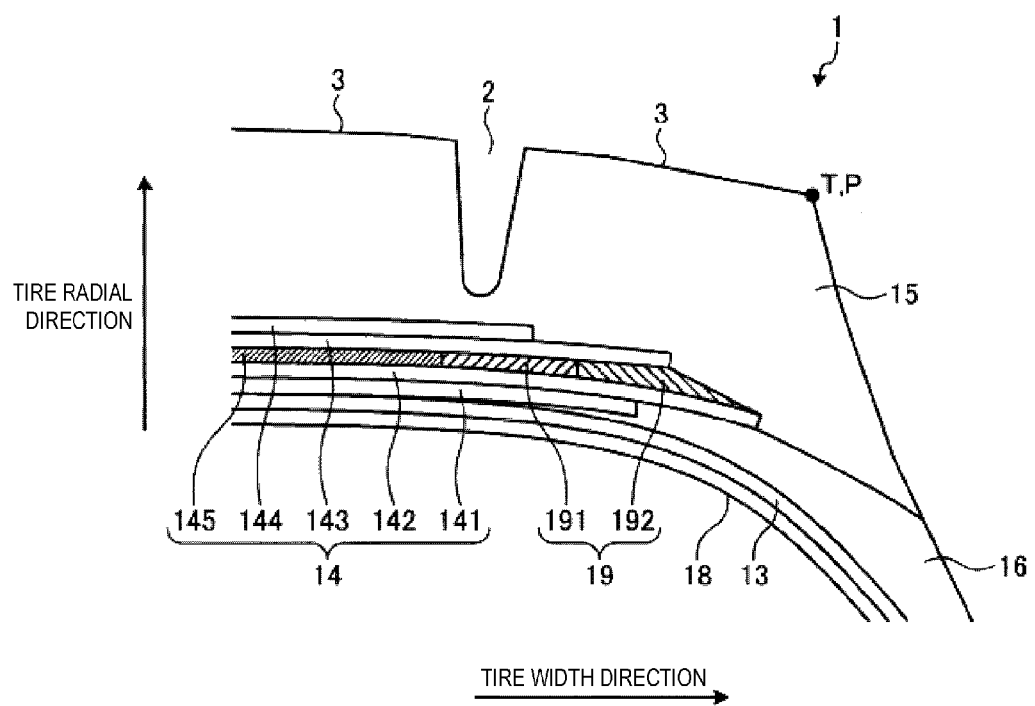
FIG. 7 is an explanatory view illustrating a modified example of the pneumatic tire depicted in FIG. 1.

FIG. 7 is an explanatory view of a modified example of the pneumatic tire depicted in FIG. 1. FIG. 7 is an enlarged view of an end portion of the belt layer 14 on the outer side in the tire width direction. In FIG. 7, the circumferential reinforcing layer 145 and the belt edge cushion 19 are indicated by hatching.

In the configuration illustrated in FIG. 1, the circumferential reinforcing layer 145 is disposed inward in the tire width direction of the left and right edges of the narrower cross belt 143 of the pair of cross belts 142, 143. The belt edge cushion 19 is disposed so as to be sandwiched between the pair of cross belts 142, 143 at a position corresponding to the edge portion of the pair of cross belts 142, 143. Specifically, the belt edge cushion 19 is disposed on the outer side of the circumferential reinforcing layer 145 in the tire width direction so as to be adjacent to the circumferential reinforcing layer 145, and extends from the end portion on the outer side of the circumferential reinforcing layer 145 in the tire width direction to the end portion on the outer side of the pair of cross belts 142, 143 in the tire width direction.

In the configuration illustrated in FIG. 1, the belt edge cushion 19 has a structure that is thicker as a whole than the circumferential reinforcing layer 145 due to the thickness increasing toward the outer side in the tire width direction. The belt edge cushion 19 has a modulus E at 100% elongation that is lower than the coating rubber of the cross belts 142, 143. Specifically, the modulus E at 100% elongation of the belt edge cushion 19 and a modulus Eco of the coating rubber have a relationship such that $0.60 \leq E/Eco \leq 0.95$. As a result, there is an advantage that the occurrence of separation of rubber materials between the pair of cross belts 142, 143 and in a region on the outer side in the tire width direction of the circumferential reinforcing layer 145 is suppressed.

The modulus at 100% elongation is measured in a tensile test at ambient temperature in conformance with JIS K6251 (using dumbbell no. 3).

Conversely, according to the configuration illustrated in FIG. 7, the belt edge cushion 19 in the configuration illustrated in FIG. 1 has a two-color structure composed of a stress relief rubber 191 and an edge portion relief rubber 192. The stress relief rubber 191 is disposed between the pair of cross belts 142, 143 on the outer side of the circumferential reinforcing layer 145 in the tire width direction so as to be adjacent to the circumferential reinforcing layer 145. The edge portion relief rubber 192 is disposed between the pair of cross belts 142, 143 on the outer side of the stress relief rubber 191 in the tire width direction at a position corresponding to the edge portion of the pair of cross belts 142, 143 so as to be adjacent to the stress relief rubber 191. Therefore, when viewed as a cross-section from the tire meridian direction, the belt edge cushion 19 has a structure composed by disposing the stress relief rubber 191 and the edge portion relief rubber 192 side to side in the tire width direction to fill a region from the end portion of the circumferential reinforcing layer 145 on the outer side in the tire width direction to the edge portion of the pair of cross belts 142, 143.

Moreover, in the configuration illustrated in FIG. 7, a modulus Ein at 100% elongation of the stress relief rubber 191 and the modulus Eco at 100% elongation of the coating rubber of the cross belts 142, 143 have a relationship such that Ein<Eco. Specifically, the modulus Ein of the stress relief rubber 191 and the modulus Eco of the coating rubber preferably have a relationship such that $0.6 \leq Ein/Eco \leq 0.9$. Additionally, the modulus Ein at 100% elongation of the stress relief rubber 191 preferably is within a range such that $4.0 \text{ MPa} \leq Ein \leq 5.5 \text{ MPa}$.

Moreover, in the configuration illustrated in FIG. 7, a modulus Eout at 100% elongation of the end portion relief rubber 192 and the modulus Ein at 100% elongation of the stress relief rubber 191 has a relationship such that Eout<Ein.

Since the stress relief rubber 191 is disposed on the outer side of the circumferential reinforcing layer 145 in the tire width direction in the configuration illustrated in FIG. 7, shearing strain of the peripheral rubbers between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the peripheral rubbers at the edge portions of the cross belts 142, 143 is alleviated. Accordingly, separation of the peripheral rubber of the circumferential reinforcing layer 145 is suppressed.

Effect

As described above, the pneumatic tire 1 includes the carcass layer 13, the belt layer 14 disposed on the outer side of the carcass layer 13 in the tire radial direction, and the tread rubber 15 disposed on the outer side of the belt layer 14 in the tire radial direction (see FIG. 1). Moreover, the belt layer 14 is formed by laminating the pair of cross belts 142, 143 having a belt angle, as an absolute value, of not less than 10° and not more than 45° and having belt angles of mutually opposite signs, and the circumferential reinforcing layer 145 having a belt angle within a range of ±5° with respect to the tire circumferential direction (see FIG. 3). Moreover, the tread width TW and the total tire width SW have a relationship such that $0.79 \leq TW/SW \leq 0.89$ (see FIG. 1).

In such a configuration, radial growth in the center region is suppressed due to the belt layer 14 having the circumferential reinforcing layer 145. Furthermore, a difference in radial growths between the center region and the shoulder region is alleviated due to the ratio TW/SW being within the above range (see FIG. 4B). As a result, there is an advantage that ground contact pressure distribution of the tire is made uniform and the rolling resistance of the tire is reduced. Specifically, the air volume inside the tire is secured and deformation is suppressed due to TW/SW being equal to or greater than 0.79. Moreover, rising of the shoulder portion is suppressed and deformation when the tire makes ground contact is suppressed due to TW/SW being less than or equal to 0.89.

Additionally, in the pneumatic tire 1, the tread width TW and a cross-sectional width Wca of the carcass layer 13 have a relationship such that $0.82 \leq TW/Wca \leq 0.92$ (see FIG. 1).

In such a configuration, radial growth in the center region is suppressed due to the belt layer 14 having the circumferential reinforcing layer 145. Furthermore, a difference in radial growths between the center region and the shoulder region is alleviated (see FIG. 4(*b*)) and the ground contact pressure distribution in the tire width direction is made uniform due to the ratio TW/Wca being within the above range. As a result, there is an advantage that ground contact pressure distribution of the tire is made uniform and the rolling resistance of the tire is reduced. Specifically, the air volume inside the tire is secured and deformation suppressed due to TW/Wca being equal to or greater than 0.82. Moreover, rising of the shoulder portion is suppressed and the ground contact pressure distribution is alleviated due to TW/Wca being less than or equal to 0.92.

In the pneumatic tire 1, the distance Gcc from the tread profile to the tire inner circumferential surface along the tire equatorial plane CL, and the distance Gsh from the tread edge P to the tire inner circumferential surface have a relationship such that 0.85≤Gsh/Gcc≤1.10 (see FIG. 2). In such a configuration, the relationship between the gauge (distance Gcc) at the tire equatorial plane CL and the gauge (distance Gsh) at the tread edge P is made appropriate and, as a result, there is an advantage that the ground contact pressure distribution of the tire is made uniform and the rolling resistance of the tire is reduced.

In the pneumatic tire 1, the width Ws of the circumferential reinforcing layer 145 relative to the tread width TW is within a range such that 0.70≤Ws/TW≤0.90 (see FIG. 1). As a result, there is an advantage that the ratio Ws/TW of the width Ws of the circumferential reinforcing layer 145 and the tread width TW is made appropriate. Specifically, the ground contact pressure distribution of the tire is made uniform and the rolling resistance of the tire is reduced due to Ws/TW being equal to or greater than 0.70. Moreover, fatigue rupture of the belt cords at the edge portions of the circumferential reinforcing layer 145 is suppressed due to Ws/TW being less than or equal to 0.90.

Moreover, in the pneumatic tire 1, the tread rubber 15 is formed by laminating the cap rubber 151 and the under rubber 152 (see FIG. 6). The loss tangent tan δ_cap of the cap rubber 151 and the loss tangent tan δ_ut of the under rubber 152 have a relationship such that tan δ_cap>tan δ_ut. With such a configuration, the tread rubber 15 has a double layer structure composed of the cap rubber 151 and the under rubber 152, and the under rubber 152 having a lower loss tangent tan δ_ut is disposed on the belt layer 14 side that easily emits heat when the tire is rolling. As a result, there is an advantage that tread stiffness is secured and the rolling resistance of the tire is reduced.

Moreover, in the pneumatic tire 1, the loss tangent tan δ_cap of the cap rubber 151 is within a range of tan δ_cap≤0.25, and the loss tangent tan δ_ut of the under rubber 152 is within a range of tan δ_ut≤0.13 (see FIG. 6). As a result, there is an advantage that the loss tangent tan δ_cap of the cap rubber 151 and the loss tangent tan δ_ut of the under rubber 152 are made appropriate. Specifically, tread stiffness is secured and the rolling resistance of the tire is reduced due to the tan δ_cap being less than or equal to 0.25, and the tan δ_ut being less than or equal to 0.13.

Moreover, in the pneumatic tire 1, the diameter Ya of the highest position and the diameter Yc of the widest position of the carcass layer 13 have a relationship such that 0.80≤Yc/Ya≤0.90 (see FIG. 1). With such a configuration, there is an advantage that the diameter ratio Yc/Ya of the carcass layer 13 is made appropriate. Specifically, the shape of the carcass layer 13 is made appropriate and the ground contact pressure distribution of the tire is made uniform due to Yc/Ya being equal to or greater than 0.80. Further, the tire shape is accurately maintained due to Yc/Ya being less than or equal to 0.90.

Also, in the pneumatic tire 1, the tire actual ground contact width Wg and the total tire width SW have a relationship such that 0.60≤Wg/SW≤0.80 (see FIG. 1 and FIG. 5). As a result, there is an advantage that the ratio Wg/SW of the tire actual ground contact width Wg and the total tire width SW is made appropriate. Specifically, the ground contact area is secured and the ground contact pressure distribution of the tire is made uniform due to Wg/SW being equal to or greater than 0.60. Further, the rubber volume of the tread portion is reduced and heat build-up is suppressed, the stiffness of the tread portion is secured, and the ground contact pressure distribution of the tire is made uniform due to Wg/SW being less than or equal to 0.80.

In the pneumatic tire 1, the tire actual ground contact width Wg and the cross-sectional width Wca of the carcass layer 13 have a relationship such that 0.64≤Wg/Wca≤0.84 (see FIGS. 1 and 5). As a result, there is an advantage that the ratio Wg/Wca of the tire actual ground contact width Wg and the cross-sectional width Wca of the carcass layer 13 is made appropriate. Specifically, the ground contact area is secured and the ground contact pressure distribution of the tire is made uniform due to Wg/Wca being equal to or greater than 0.64. Further, the rubber volume of the tread portion is reduced and heat build-up is suppressed, the stiffness of the tread portion is secured, and the ground contact pressure distribution of the tire is made uniform due to Wg/Wca being less than or equal to 0.84.

Also, in the pneumatic tire 1, the belt cords that constitute the circumferential reinforcing layer 145 are steel wire, and the circumferential reinforcing layer 145 has not less than 17 ends/50 mm and not more than 30 ends/50 mm. As a result, there is an advantage that the effect of suppressing radial growth in the center region is properly secured due to the circumferential reinforcing layer 145.

In the pneumatic tire 1, the elongation of the belt cords from which the circumferential reinforcing layer 145 is configured when they are components when subjected to a tensile load of 100 N to 300 N is preferably not less than 1.0% and not more than 2.5%. As a result, there is an advantage that the effect of suppressing radial growth in the center region is properly secured due to the circumferential reinforcing layer 145.

Also, in the pneumatic tire 1, the circumferential reinforcing layer 145 is disposed inward in the tire width direction from the left and right edges of the narrower cross belt 143 of the pair of cross belts 142, 143 (see FIG. 3). Also, a width Wb of the narrower cross belt 143 and the distance S from the edge of the circumferential reinforcing layer 145 to the edge of the narrower cross belt 143 are in the ranges such that 0.03≤S/Wb. As a result, there is an advantage that the distance between the end portion of the width Wb of the cross belt 143 and the end portion of the circumferential reinforcing layer 145 is properly secured, and separation between rubber materials at the end portion of the circumferential reinforcing layer 145 is suppressed.

Also, in the pneumatic tire 1, the circumferential reinforcing layer 145 is disposed inward in the tire width direction from the left and right edges of the narrower cross belt 143 of the pair of cross belts 142, 143 (see FIG. 3). The pneumatic tire 1 includes the stress relief rubber 191 disposed between the pair of cross belts 142, 143 and on the outer side of the circumferential reinforcing layer 145 in the tire width direction so as to be adjacent to the circumferential reinforcing layer 145, and the end portion relief rubber 192 disposed between the pair of cross belts 142, 143 and on the outer side of the stress relief rubber 191 in the tire width direction and at a position corresponding to the edge portion of the pair of cross belts 142, 143 so as to be adjacent to the stress relief rubber 191 (see FIG. 7).

In such a configuration, there is an advantage that fatigue rupture of the periphery rubber at the edge portion of the circumferential reinforcing layer 145 is suppressed due to the circumferential reinforcing layer 145 being disposed on the inner side in the tire width direction of the left and right edge portions of the narrower cross belt 143 of the pair of cross belts 142, 143. Since the stress relief rubber 191 is disposed on the outer side of the circumferential reinforcing layer 145 in the tire width direction, shearing strain of the periphery rubber between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the periphery rubber at the edge portions of the cross belts 142, 143 is alleviated. Accordingly, there is an advantage that separation of the periphery rubber of the circumferential reinforcing layer 145 is suppressed.

In the pneumatic tire 1, the modulus Ein at 100% elongation of the stress relief rubber 191 and the modulus Eco at 100% elongation of the coating rubber of the pair of cross belts 142, 143 have a relationship such that Ein<Eco (see FIG. 7). As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

In the pneumatic tire 1, the modulus Ein at 100% elongation of the stress relief rubber 191 and the modulus Eco at 100% elongation of the coating rubber of the pair of cross belts 142, 143 have a relationship such that $0.6 \leq Ein/Eco \leq 0.9$ (see FIG. 7). As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

Additionally, in the pneumatic tire 1, the modulus Ein at 100% elongation of the stress relief rubber 191 is within a range of $4.0 \text{ MPa} \leq Ein \leq 5.5 \text{ MPa}$ (see FIG. 7). As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

Target of Application

The pneumatic tire 1 is preferably applied to a heavy duty tire with an aspect ratio of not less than 40% and not more than 55% when assembled on a regular rim, inflated with the prescribed internal pressure and the regular load is applied. A heavy duty tire has a higher load under use than a passenger car tire. Thus, a radial difference occurs easily between the region where the circumferential reinforcing layer is disposed and the regions on the outer side of the circumferential reinforcing layer in the tire width direction. Moreover, a ground contact shape having an hourglass shape occurs easily in the tire having the above-mentioned low aspect ratio. Accordingly, a noticeable effect in suppressing the abovementioned rolling resistance is achieved by applying the pneumatic tire 1 to such a heavy duty tire.

EXAMPLES

FIGS. 8a through 9b are tables showing the results of performance testing of pneumatic tires according to the embodiment of the present invention.

Evaluations for (1) rolling resistance and (2) belt-edge separation resistance of a plurality of mutually different pneumatic tires were conducted for the performance tests (see FIGS. 8a through 9b). Pneumatic tires having a tire size of 445/50R22.5 were assembled on a standard rim (rim size 22.5×14.0) defined by TRA, and a maximum air pressure defined by TRA (830 kPa) and a load of 45.37 kN were applied to these pneumatic tires.

(1) In the evaluations concerning rolling resistance, an indoor rolling resistance testing machine was used to measure the rolling resistance at a load of 45.37 kN and a speed of 80 km/h. Results of the evaluations were indexed and the index value of the pneumatic tire of the Conventional Example was set as the standard score (100). Higher scores were preferable. 110 or more in the evaluations indicate superiority over the conventional examples, and 115 or more demonstrate a sufficient effect.

(2) Evaluations concerning belt-edge separation resistance were conducted by low pressure durability testing using an indoor drum testing machine. The travel speed was set to 45 km/h and the load was gradually increased from 45.37 kN by 5% (2.27 kN) every 12 hours to measure the travel distance until the tire ruptured. Index scoring against a conventional standard score of 100 was conducted based on the measurement results. In these evaluations, higher scores were preferable. 110 or more in the evaluations indicate superiority over the conventional examples, and 115 or more demonstrate a sufficient effect.

The pneumatic tires 1 of Working Examples 1 to 29 had the configuration depicted in FIGS. 1 to 3. Further, the total tire width SW was SW=446 mm. Moreover, the modulus at 100% elongation of the coating rubber of all the belt layers 14 was 6.0 MPa.

The pneumatic tire 1 of Working Example 30 was the modified example of the configuration depicted in FIGS. 1 to 3 and had the configuration depicted in FIG. 7. The modulus Ein at 100% elongation of the stress relief rubber 191 was Ein=4.8 MPa.

In the configuration illustrated in FIGS. 1 to 3, the pneumatic tire of the Conventional Example does not have the circumferential reinforcing layer. The pneumatic tire of Comparative Example had the configuration depicted in FIGS. 1 to 3.

As is clear from the test results, with the pneumatic tires 1 of Working Examples 1 to 30, uneven wear resistance performance of the tires is enhanced.

What is claimed is:

1. A pneumatic tire comprising a carcass layer, a belt layer disposed outward in a tire radial direction of the carcass layer, and a tread rubber disposed outward in the tire radial direction of the belt layer; wherein the belt layer is formed by laminating a pair of cross belts having a belt angle, as an absolute value, of not less than 10° and not more than 45° and having a belt angle of mutually opposite signs, and a circumferential reinforcing layer having a belt angle within a range of ±5° with respect to a tire circumferential direction;

a tread width TW and a total tire width SW have a relationship such that $0.79 \leq TW/SW \leq 0.89$;

a distance Gcc from a tread profile to an tire inner circumferential surface along a tire equatorial plane, and a distance Gsh from a tread edge to the tire inner circumferential surface have a relationship such that $0.85 \leq Gsh/Gcc \leq 1.10$;

a tire actual ground contact width Wg and the total tire width SW have a relationship such that $0.60 \leq Wg/SW \leq 0.78$;

the circumferential reinforcing layer is disposed so as to be interposed between the pair of cross belts;

the circumferential reinforcing layer is disposed inward in the tire width direction from left and right edges of a narrower cross belt of the pair of cross belts;

a belt edge cushion is disposed so as to be sandwiched between the pair of cross belts at a position corresponding to an edge portion of the pair of cross belts;

the belt edge cushion is disposed on an outer side of the circumferential reinforcing layer in the tire width direction;

seven circumferential main grooves extend in a tire circumferential direction defining eight land portions in the tread rubber;

an outermost circumferential main groove in the tire width direction is inside in the tire width direction of the edge of the wider cross belt, and is outside in the tire width direction of the edge of the circumferential reinforcing layer;

a width Ws of the circumferential reinforcing layer relative to the tread width TW is within a range of $0.70 \leq Ws/TW \leq 0.90$;

the tread rubber is formed by laminating a cap rubber and an under rubber, and a loss tangent tan $\delta$_cap of the cap rubber and a loss tangent tan $\delta$_ut of the under rubber have a relationship such that tan $\delta$_cap>tan $\delta$_ut;

the loss tangent tan $\delta$_cap of the cap rubber is within a range of tan $\delta$_cap$\leq$0.25, and the loss tangent tan $\delta$_ut of the under rubber is within a range of tan $\delta$_ut$\leq$0.13;

belt cords that configure the circumferential reinforcing layer are steel wire, and a number of ends of the circumferential reinforcing layer is not less than 17 ends/50 mm and not more than 30 ends/50 mm; and elongation of the belt cords from which the circumferential reinforcing layer is configured when they are components when subjected to a tensile load of 100 N to 300 N is not less than 1.0% and not more than 2.5%.

2. The pneumatic tire according to claim 1, wherein a diameter Ya of the highest position of the carcass layer and a diameter Yc of the widest position of the carcass layer have a relationship such that $0.80 \leq Yc/Ya \leq 0.90$.

3. The pneumatic tire according to claim 1, wherein the tire actual ground contact width Wg and the cross-sectional width Wca of the carcass layer have a relationship such that $0.64 \leq Wg/Wca \leq 0.84$.

4. The pneumatic tire according to claim 1, wherein belt cords that configure the circumferential reinforcing layer are steel wire, and a number of ends of the circumferential reinforcing layer is not less than 17 ends/50 mm and not more than 30 ends/50 mm.

5. The pneumatic tire according to claim 1, wherein elongation of the belt cords from which the circumferential reinforcing layer is configured when they are components when subjected to a tensile load of 100 N to 300 N is not less than 1.0% and not more than 2.5%.

6. The pneumatic tire according to claim 1, wherein a width Wb of the narrower cross belt and a distance S from an edge of the circumferential reinforcing layer to an edge of the narrower cross belt are in ranges such that $0.03 \leq S/Wb$.

7. The pneumatic tire according to claim 1, wherein the circumferential reinforcing layer includes
a stress relief rubber disposed between the pair of cross belts and disposed outward in the tire width direction of the circumferential reinforcing layer so as to be adjacent to the circumferential reinforcing layer; and
an end portion relief rubber disposed between the pair of cross belts and disposed outward in the tire width direction of the stress relief rubber and at a position corresponding to an edge portion of the pair of cross belts so as to be adjacent to the stress relief rubber.

8. The pneumatic tire according to claim 7, wherein a modulus Ein at 100% elongation of the stress relief rubber and a modulus Eco at 100% elongation of coating rubber of the pair of cross belts have a relationship such that Ein<Eco.

9. The pneumatic tire according to claim 7, wherein the modulus Ein at 100% elongation of the stress relief rubber and the modulus Eco at 100% elongation of coating rubber of the pair of cross belts have a relationship such that $0.6 \leq Ein/Eco \leq 0.9$.

10. The pneumatic tire according to claim 7, wherein the modulus Ein at 100% elongation of the stress relief rubber is within a range of 4.0 MPa$\leq$Ein$\leq$5.5 MPa.

11. The pneumatic tire according to claim 1 applied to a tire with an aspect ratio of 55% or less.

12. The pneumatic tire according to claim 1, wherein a distance Gcc from a tread profile to an tire inner circumferential surface along a tire equatorial plane, and a distance Gsh from a tread edge to the tire inner circumferential surface have a relationship such that $0.90 \leq Gsh/Gcc \leq 1.00$.

13. The pneumatic tire according to claim 1, wherein a width Ws of the circumferential reinforcing layer relative to the tread width TW is within a range of $0.70 \leq Ws/TW \leq 0.90$; and a width Wb of the narrower cross belt and a distance S from an edge of the circumferential reinforcing layer to an edge of the narrower cross belt are in ranges such that $0.03 \leq S/Wb$.

14. The pneumatic tire according to claim 1, wherein a width Ws of the circumferential reinforcing layer relative to the tread width TW is within a range of $0.70 \leq Ws/TW \leq 0.90$; and a width Wb of the narrower cross belt and a distance S from an edge of the circumferential reinforcing layer to an edge of the narrower cross belt are in ranges such that $0.03 \leq S/Wb$.

15. The pneumatic tire according to claim 1, wherein:
a width Ws of the circumferential reinforcing layer relative to the tread width TW is within a range of $0.70 \leq Ws/TW \leq 0.90$;
a diameter Ya of the highest position of the carcass layer and a diameter Yc of the widest position of the carcass layer have a relationship such that $0.80 \leq Yc/Ya \leq 0.90$;
the tread rubber is formed by laminating a cap rubber and an under rubber, and a loss tangent tan $\delta$_cap of the cap rubber and a loss tangent tan $\delta$_ut of the under rubber have a relationship such that tan $\delta$_cap>tan $\delta$_ut; and
the loss tangent tan $\delta$_cap of the cap rubber is within a range of tan $\delta$_cap$\leq$0.25, and the loss tangent tan $\delta$_ut of the under rubber is within a range of tan $\delta$_ut$\leq$0.13.

16. The pneumatic tire according to claim 15, wherein the circumferential reinforcing layer includes a stress relief rubber disposed between the pair of cross belts and disposed outward in the tire width direction of the circumferential reinforcing layer so as to be adjacent to the circumferential reinforcing layer; and an end portion relief rubber disposed between the pair of cross belts and disposed outward in the tire width direction of the stress relief rubber and at a position corresponding to an edge portion of the pair of cross belts so as to be adjacent to the stress relief rubber.

17. A pneumatic tire comprising a carcass layer, a belt layer disposed outward in a tire radial direction of the carcass layer, and a tread rubber disposed outward in the tire radial direction of the belt layer; wherein
the belt layer is formed by laminating a pair of cross belts having a belt angle, as an absolute value, of not less than 10° and not more than 45° and having a belt angle of mutually opposite signs, and a circumferential reinforcing layer having a belt angle within a range of ±5° with respect to a tire circumferential direction;
a tread width TW and a cross-sectional width Wca of the carcass layer have a relationship such that $0.82 \leq TW/Wca \leq 0.92$;

a distance Gcc from a tread profile to an tire inner circumferential surface along a tire equatorial plane, and a distance Gsh from a tread edge to the tire inner circumferential surface have a relationship such that $0.85 \leq Gsh/Gcc \leq 1.10$;

a tire actual ground contact width Wg and the cross-sectional width Wca of the carcass layer have a relationship such that $0.64 \leq Wg/Wca \leq 0.84$;

the circumferential reinforcing layer is disposed so as to be interposed between the pair of cross belts;

the circumferential reinforcing layer is disposed inward in the tire width direction from left and right edges of a narrower cross belt of the pair of cross belts;

a belt edge cushion is disposed so as to be sandwiched between the pair of cross belts at a position corresponding to an edge portion of the pair of cross belts;

the belt edge cushion is disposed on an outer side of the circumferential reinforcing layer in the tire width direction;

seven circumferential main grooves extend in a tire circumferential direction defining eight land portions in the tread rubber;

an outermost circumferential main groove in the tire width direction is inside in the tire width direction of the edge of the wider cross belt, and is outside in the tire width direction of the edge of the circumferential reinforcing layer;

a width Ws of the circumferential reinforcing layer relative to the tread width TW is within a range of $0.70 \leq Ws/TW \leq 0.90$;

the tread rubber is formed by laminating a cap rubber and an under rubber, and a loss tangent tan δ_cap of the cap rubber and a loss tangent tan δ_ut of the under rubber have a relationship such that tan δ_cap>tan δ_ut;

the loss tangent tan δ_cap of the cap rubber is within a range of tan $δ\_cap \leq 0.25$, and the loss tangent tan δ_ut of the under rubber is within a range of tan $δ\_ut \leq 0.13$, belt cords that configure the circumferential reinforcing layer are steel wire, and a number of ends of the circumferential reinforcing layer is not less than 17 ends/50 mm and not more than 30 ends/50 mm, and elongation of the belt cords from which the circumferential reinforcing layer is configured when they are components when subjected to a tensile load of 100 N to 300 N is not less than 1.0% and not more than 2.5%.

18. The pneumatic tire according to claim 17, wherein:

a width Ws of the circumferential reinforcing layer relative to the tread width TW is within a range of $0.70 \leq Ws/TW \leq 0.90$;

a diameter Ya of the highest position of the carcass layer and a diameter Yc of the widest position of the carcass layer have a relationship such that $0.80 \leq Yc/Ya \leq 0.90$;

the tread rubber is formed by laminating a cap rubber and an under rubber, and a loss tangent tan δ_cap of the cap rubber and a loss tangent tan δ_ut of the under rubber have a relationship such that tan δ_cap>tan δ_ut; and the loss tangent tan δ_ cap of the cap rubber is within a range of tan $δ\_cap \leq 0.25$, and the loss tangent tan δ_ut of the under rubber is within a range of tan $δ\_ut \leq 0.13$.

19. The pneumatic tire according to claim 18, wherein the circumferential reinforcing layer includes a stress relief rubber disposed between the pair of cross belts and disposed outward in the tire width direction of the circumferential reinforcing layer so as to be adjacent to the circumferential reinforcing layer; and an end portion relief rubber disposed between the pair of cross belts and disposed outward in the tire width direction of the stress relief rubber and at a position corresponding to an edge portion of the pair of cross belts so as to be adjacent to the stress relief rubber.

* * * * *